A. B. Sprout.

Horse Hay-Fork.

No 2817

Reissued Dec. 17, 1867.

Witnesses:
James McBride
James J. Johnston

Inventor.
A. B. Sprout

United States Patent Office.

A. B. SPROUT, OF HUGHESVILLE, PENNSYLVANIA.

*Letters Patent No.* 64,163, *dated April* 23, 1867; *reissue No.* 2,817, *dated December* 17, 1867.

IMPROVEMENT IN HORSE HAY-FORKS.

The Schedule referred to in these Letters Patent and making part of the same.

TO ALL WHOM IT MAY CONCERN:

Be it known that I, A. B. SPROUT, of Hughesville, in the county of Lycoming, and State of Pennsylvania, have invented a new and useful Improvement in Hay-Elevators; and I do hereby declare the following to be a full and exact description thereof, reference being had to the accompanying drawing, and to the letters of reference marked thereon.

My invention consists in an improvement of the "horse hay-fork" for which Letters Patent of the United States were granted to me on the 1st day of May, 1866, and numbered 54,431.

The nature of my invention, as herein described, consists in providing the penetrating-point or poin' f a "horse hay-fork" with a cutting-edge or edges, for cutting its way into the hay, and so constructed that it can be operated so as to catch and hold in the hay for elevating it, and then released from the hay for the purpose of discharging it from the fork.

To enable others skilled in the art to make and use my invention, I will proceed to describe its construction. In the accompanying drawing which forms part of this specification—

Figure 1:
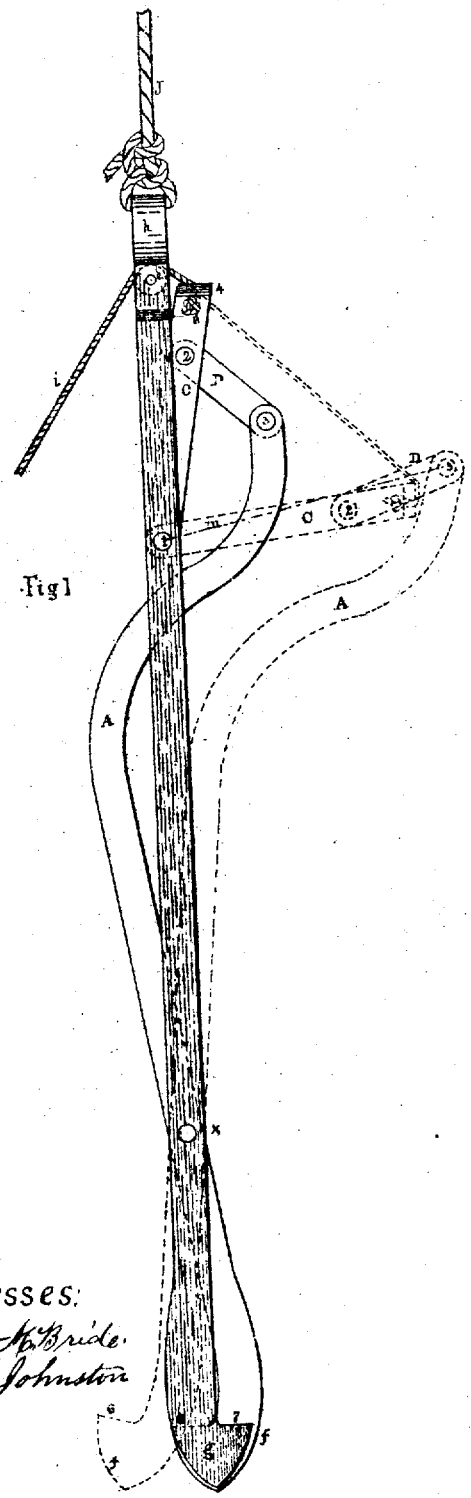
Figure 1 represents a side elevation of my improved hay-elevator.

In the drawings, A and B represent two flat bars of iron or steel, or steel and iron combined. Said bars are bent into the form represented in figs. 1 and 2, and are hinged or pivoted at the point marked *x*. The upper end of the bar B is provided with a ring or loop, *h*, and pulley, *e*. To the upper end of the bar A is pivoted, at the point marked 3, a bar or lever, D, which is pivoted to a bar or lever, C, at the point marked 2, which bar or lever C is pivoted to the bar B at the point marked 1. To the part 4 of the bar or lever C is attached a cord or rope, *i*, which passes up over the pulley *e*. To the ring or loop *h* is attached the hoisting-rope J. The lower ends of the bars A and B are provided with coniform points marked *f* and *g*, which points are furnished with shoulders or hooks 6 and 7. The inner side of the coniform points *f* and *g* are flat, and in grinding are made slightly concave, so that they fit together, and the outside of said points is bevelled off to a sharp edge. The edges of the point *f* project slightly past the edges of the point *g* for the purpose of forming a keen cutting-edge to the point.

Figure 2:
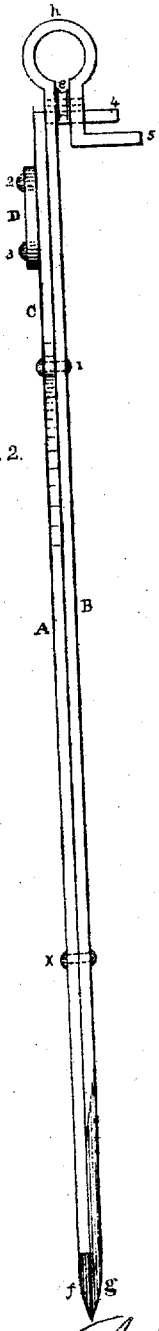
Figure 2 represents an edge view of the same.

The operation of my improvement is as follows: When I desire to cut out part of the stack or mow of hay, I open out the points, as indicated by the dotted lines in fig. 1, and when thus opened out, I force the points down into the hay, and they will cut, at each thrust of the fork or elevator, a gap equal in length to the distance between the outer edges of the points *f* and *g*, and the depth of the cut will be equal to the distance it is forced down into the hay when the desired part of the stack or mow is cut out. I then close up the fork or elevator, as shown in figs. 1 and 2. I then, by pressing down on the ring *h* and the part marked 5, force the fork or elevator down into the centre of the mass of hay which has been cut loose. I then press down on the part 4 of the bar-lever C, which will spread out the bars A and B at the upper end, which spreading of the bars will open out or spread the points *f* and *g* and cause the shoulders or hooks 6 and 7 to catch in the hay, taking care to spread the bars A and B until the pivot-joint 2 drops below the line marked *m*. I then hoist the hay by drawing on rope J until it is elevated to the desired place. I then draw on cord *i*, which will draw up the bars or levers C and D, which will bring the upper ends of the bars A and B together and close the points *f* and *g*, which closing of the points will allow the hay to drop off the fork or elevator. By use of cutting-edges on the points *f* and *g*, and so arranging them that when they are closed up they will form a single point provided with a cutting-edge, the fork or elevator can with greater ease be forced into the hay, for the point cuts the way for the fork or elevator, and thereby greatly lessens the labor of forcing the fork or elevator into the hay.

Having thus described the nature, construction, and operation of my improvement, what I claim as of my invention, is—

1. Providing the extreme penetrating-point or points of a horse hay-fork with a cutting-edge or edges for cutting its way into the hay, said points being so constructed that they can be operated so as to catch and hold in the hay for elevating it, and be released at will from the hay for discharging it.

2. The coniform points *f* and *g*, provided with cutting-edges, and shoulders or hooks 6 and 7, constructed, arranged, and operating substantially as herein described, and for the purpose set forth.

Witnesses: A. B. SPROUT.

THEODORE W. LITTLE,

R. S. SHOEMAKER.